June 17, 1952 G. BUCKY 2,601,086
CLOSE-UP STEREO CAMERA
Filed June 3, 1950 4 Sheets-Sheet 2

INVENTOR.
Gustav Bucky
BY Walter S. Beston
ATTORNEY

June 17, 1952 — G. BUCKY — 2,601,086
CLOSE-UP STEREO CAMERA
Filed June 3, 1950 — 4 Sheets-Sheet 3
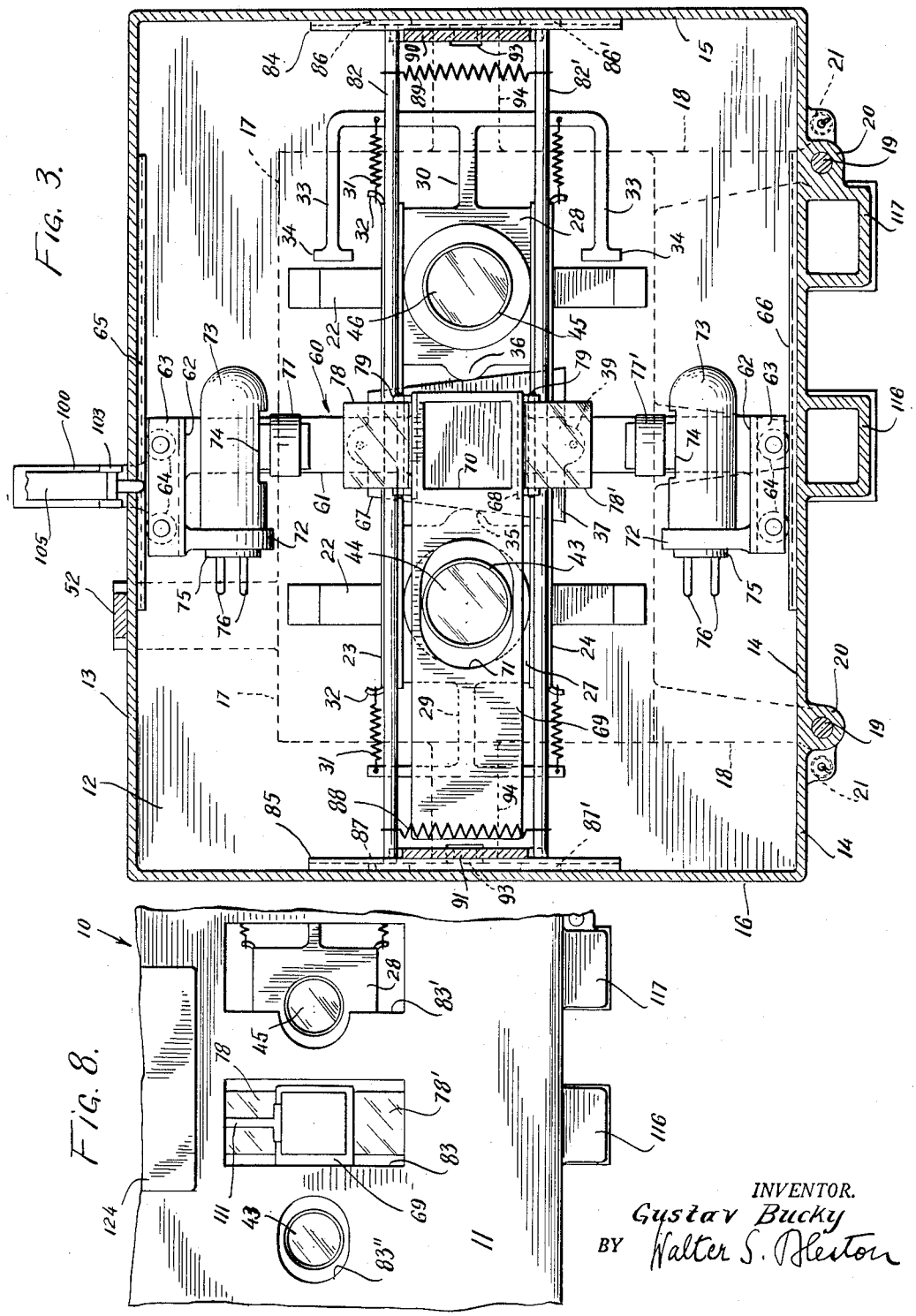
INVENTOR.
Gustav Bucky
BY Walter S. Hexton
ATTORNEY.

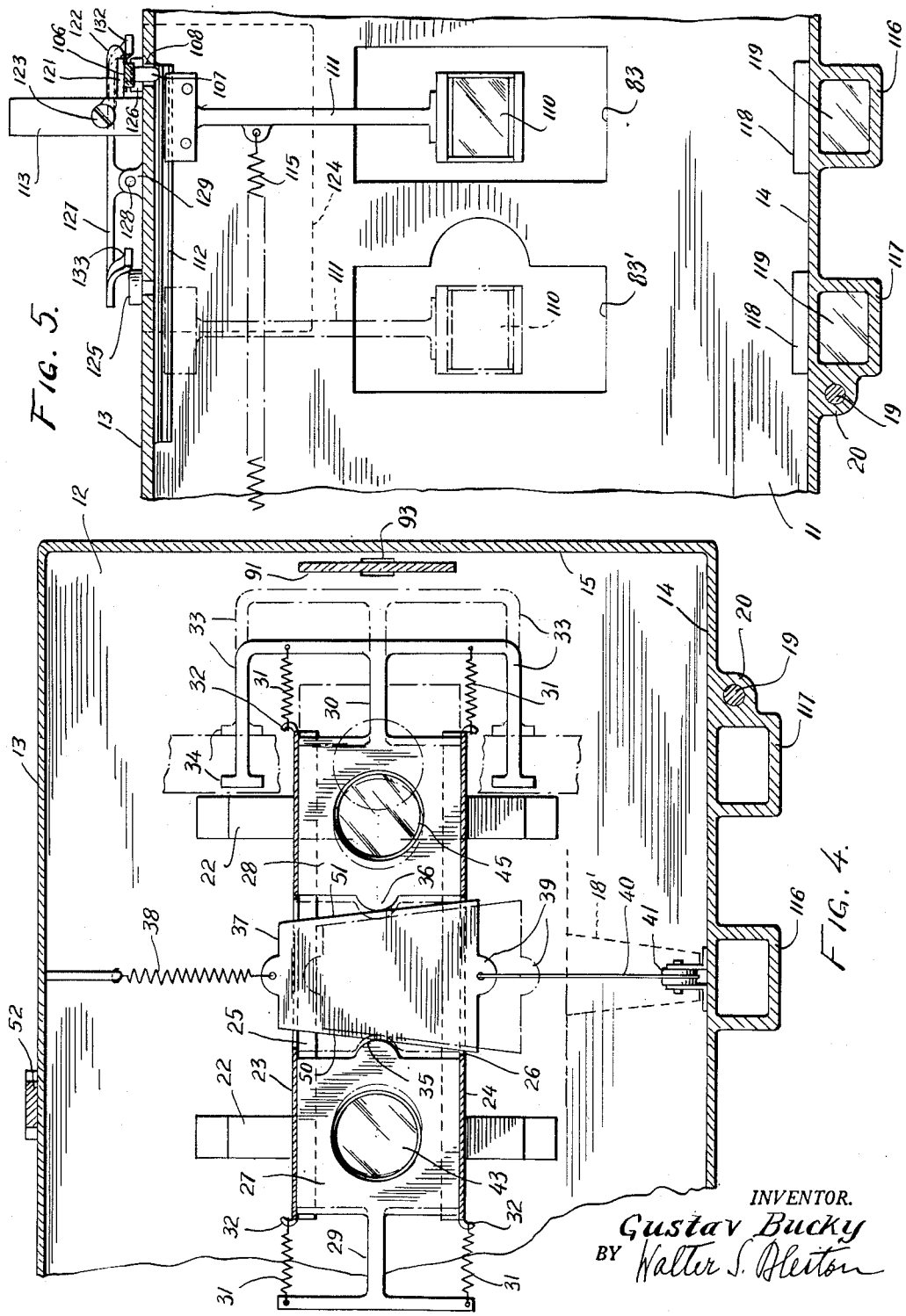

Patented June 17, 1952

2,601,086

UNITED STATES PATENT OFFICE 2,601,086

CLOSE-UP STEREO CAMERA

Gustav Bucky, New York, N. Y.

Application June 3, 1950, Serial No. 165,921

13 Claims. (Cl. 95—18)

The invention relates to a camera for stereoscopic pictures and more particularly for close-up exposures. The conventional stereoscopic cameras have a pair of lenses with fixed spacing from each other. However, if close-up exposures are to be made particularly as frequently required in medical investigation work, I have found that best stereoscopic results are obtainable if the spacing of the lenses is varied in accordance with the focusing of the camera, that means, in accordance with the distance of the objective and the carrier of the light sensitive surface such as a plate or a film.

The invention aims therefore to provide a camera in which the spacing of the lenses from each other can be varied in accordance with variations of the distance of the objective from the carrier of the light-sensitive surface. Another object of the invention is to provide means whereby the light from an artificial source is projected upon an area of an object to be photographed and in which the direction of the rays from such artificial source are also varied in accordance with variations of the distance of the objective from the carrier of the light-sensitive surface, that means in accordance with the focusing.

A further object is the provision of means whereby the stereoscopic close-up camera can be rendered useful for single exposures without stereoscopic effect, wherein however the mentioned means for varying the direction of the light rays is effective regardless whether the camera is set for stereo or single exposures.

Further details and objects of the invention will be apparent from the description given hereinafter and the accompanying drawing illustrating an embodiment thereof by way of example.

In the drawing:

Fig. 1 is a top plan view of a camera according to the invention,

Fig. 2 is a longitudinal section along line 2—2 of Fig. 1; the carrier for the sensitive surface being shown in elevation, Fig. 3 is a section along line 3—3 of Fig. 2, Fig. 4 is a section along line 4—4 of Fig. 2 showing the means for varying the spacing of the objectives, Fig. 5 is a section along line 5—5 of Fig. 2 showing the viewing means in position for stereo exposures, Fig. 6 is a section along line 6—6 of Fig. 2.

Fig. 8 shows the center part of the front wall.

Figure 1:
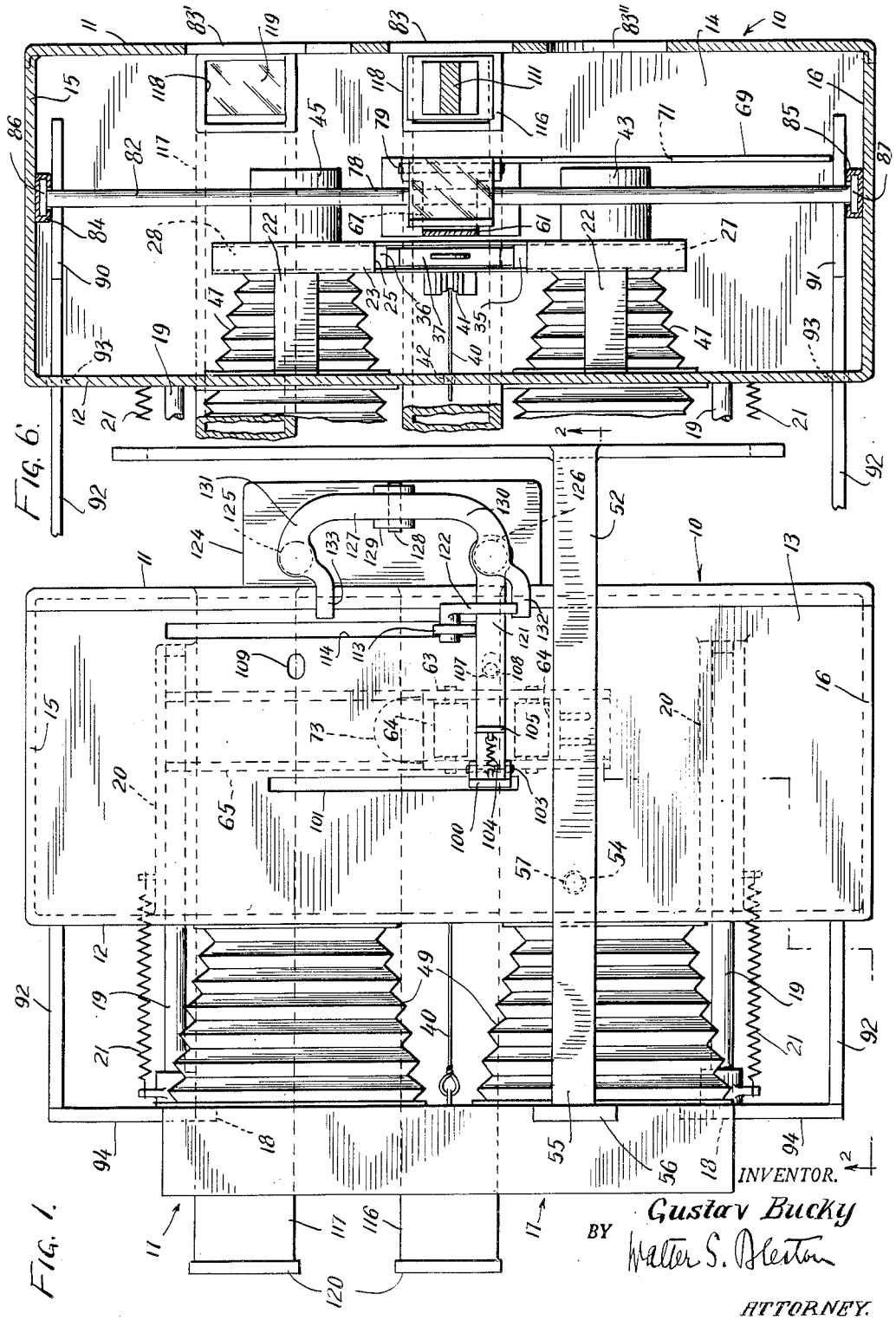

Referring now to the drawing, the optical part of the camera in general denoted by 10 comprises a front wall 11, rear wall 12, top wall 13, bottom wall 14 and side walls 15 and 16, respectively. The carrier part for the plate or film provided with a light-sensitive surface is, in general, denoted by 17. Its interior structure may be arranged in any suitable manner conventional in stereo-cameras, and for that reason, is not specifically shown. Part 17 has two lower lugs 18, each of which has attached thereto a horizontally extending bar 19 which is guided in a tubular extension 20 on the bottom wall 14 of part 10. Furthermore, tension springs 21 are also connected to lugs 18 and part 10 so as to urge the parts 10 and 11 towards each other. Interiorly of the optical part 10 and affixed to the wall 12, there is an inner bracket 22 (Figs. 2, 3, 4) which is provided with an upper guide channel 23 and a lower channel 24. In the central parts of the guide channels the web and the front flange are interrupted at 25 and 26, respectively. Substantially square pieces 27 and 28 are slidably arranged in channels 23 and 24 (Fig. 4). The opposite ends of the pieces 27 and 28 have a T-shaped extension 29 and 30, respectively, the arms of which are connected by tension springs 31 to hook-shaped ends 32 of the channels 23 and 24. For a purpose to be explained hereinafter in connection with the adaptation of the camera for single exposures, the arms 33 of the extension 30 are bent back on top and below channels 23 and 24 and end in abutments 34. The adjacent edges of the pieces 27 and 28 are bulged so as to form projections 35 and 36, respectively. A wedge-shaped member 37, best seen in Fig. 4, is suspended by a spring 38 from the top wall 13 of the optical part 10. The wedge has a lower ear 39 to which the one end of a flexible member 40 is attached. Member 40 is guided over a pulley 41 on the bottom wall 14, then, passed through a hole 42 close to the bottom of the rear wall 12 and connected with its other end to a lug 18' which extends downward from part 17 between the afore-mentioned lugs 18. An objective mount 43 is secured to the front of the square piece 27 in registry with a hole 44 provided in the latter. Similarly piece 28 carries an objective mount 45 in registry with a hole 46. To the rear of piece 27 a conical bellows 47 is attached which is secured to wall 12 so as to embrace an opening 48. In continuation of bellows 47, a bellows 49 is provided which is attached to the outside of wall 12 and to the carrier part 17. Similarly, bellows and openings are provided with respect to piece 28. Now it will be clear that the wedge 37 will be pulled downward by flexible member 40 against the restraint of spring 38 when the spacing of the parts 10 and 17 is increased and that, on the other hand, owing to the tension of spring 38 wedge 37 will be raised when the spacing of the parts 10 and 17 will be decreased. Thereby the wedge faces 50 and 51 bearing against the bulges 35 and 36, respectively, will increase the spacing of the objectives 43 and 45 when the parts 10 and 17 are shifted towards each other and that the spacing of the objectives will decrease according to an increase of the spacing of the parts 10 and 17. It will be noticed that the edges 50 and 51 of the wedge have been shown as a straight line. It is, of course, possible to give these edges any desired curvature or to apply any other suitable and conventional means in order to adopt any law as to the ratio of the spacing of the objectives from each other to the spacing of the objectives from a sensitive surface carried by part 17.

In order to adjust the spacing of the objective from part 17 according to the distance of an object to be photographed, that means, in order to focus the camera any suitable and conventional means may be applied. Exchangeable spacers similar to the kind described in my co-pending application Serial No. 153,447, filed April 1, 1950, and in my Patent 2,239,379, dated April 22, 1941, are examples of such means. In the illustrated embodiment, such spacer 52 includes a front frame 53 determinative of an area and distance of an object to be photographed, and, furthermore, a downward extension 54 intermediate its ends, and a tail 55 which can bear against a lug 56 on top of the carrier part 17. The spacer can be applied by pulling part 17 backward in relation to part 10, inserting extension 54 into a hole 57 in the top wall 13 of part 10, and, then, releasing the carrier part 17 until lug 56 abuts against the end of the portion 55. If the dimensions of the spacer 52 and of the wedge 37 are correctly selected, the spacing of the objectives 43 and 45 from each other will be in accordance with the focusing of the camera in relation to the distance of the frame 53 from the objectives.

Figure 7:
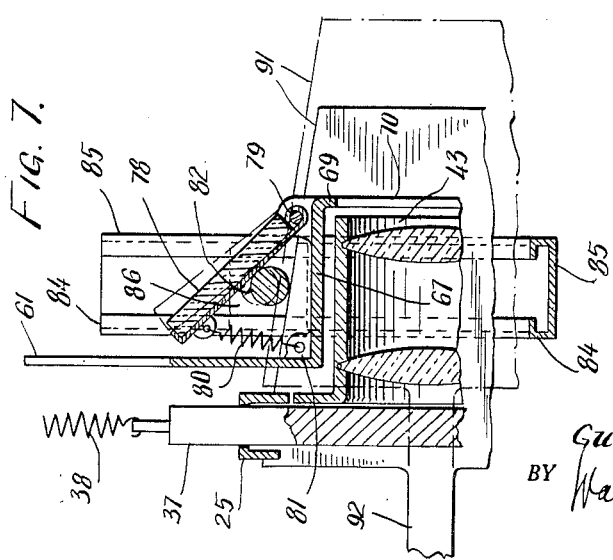
Fig. 7 shows the central part of Fig. 2 on an enlarged scale.

An artificial light source and means are provided to direct rays from that artificial source to an object area determined by frame 53. In the illustrated embodiment the means for that purpose are suited for use with the camera when taking stereo pictures as well as when making single exposures. If the camera is to be used exclusively for stereo photography, certain simplifications are possible which will be pointed out hereinafter. The mentioned means, best seen in Figs. 2 and 3 comprise a carriage 60 which may be a sheet metal strip or bar 61 extending vertically in camera part 10 in front of the guide channels 23 and 24. At the upper and lower ends the strip 61 forms brackets 62 with bearings 63 for rollers 64 which are movable in channels 65 and 66 of the top and bottom walls 13 and 14 respectively. Thus, the carriage can be shifted selectively into a central position between the two objectives 43 and 45 for stereo exposures or into a position in front of the objective 45 for single shots. When being shifted into the last mentioned position, the carriage engages the aforementioned abutments 34 of the piece 28 on which objective 45 is mounted and pushes it so far to the side that it is disengaged from the wedge 37 in any position of the latter. In its central part, strip 61 is rectangularly bent so that there is a portion 67 on top, another portion 68 on the bottom and a third portion 69 in a plane in front of the objectives 43 and 45. The front portion 69 is provided with a hole 70 of a size according to the diameter of one of the objectives so that by shifting carriage 60 to the right in Fig. 3 opening 70 can be positioned in front of objective 45. The front portion 69 of the carriage is extended to the left side in Fig. 3 beyond objective 43 so as to cover that objective when the carriage is in the last-mentioned position. Intermediate its end and the opening 70, portion 69 is further provided with an elongated opening 71. The size of that hole and all other dimensions are such that with the carriage shifted to a position in which the center of opening 70 coincides with the vertical central plane of part 10, opening 71 will be in front of objective 43 regardless of the spacing of the objectives from each other. Thus, when the carriage is shifted to the mentioned central position both objectives 43 and 45 are unobstructed, whereas with the carriage shifted to its right hand end position, only the objective 45 is free. In the event, however, each objective is provided with a separate shutter in such an arrangement that both can be operated simultaneously and also the shutter of objective 45 separately, the lateral extension of the front part 69 with the hole 71 can be omitted. Near its upper end below the bracket 62 a bulb socket 72 is secured to the carriage and a bulb housing 73 is applied in continuation of the socket 72. The housing has a downwardly directed opening 74. A bulb 75 may be secured in the housing 73 so that an electric current source can be connected to the terminals 76 of the bulb. A condenser 77 is mounted on strip 61 underneath opening 74 in such a manner that light rays from the bulb passing through the condenser 77 will impinge on a mirror 78 pivoted at 79 on portion 67 of the carriage as clearly shown in Figs. 2 and 7. A tension spring 80 attached to the rear of the mirror 78 and to an eye 81 on the carriage tends to turn the mirror in a counter-clockwise direction. The mirror is prevented from turning by a rod 82 extending transversely with respect to the camera part 10. By raising or lowering rod 82, the angle position of the mirror 78 can be altered so that rays from bulb 73 passing through condenser 77 will be reflected forward with respect to the camera and through an opening 83 of the front wall 11 upon an object area determined by the frame 53. In an arrangement symmetrical to the parts just described in relation to the horizontal central plane there is a lower bulb 75', a condenser 77', mirror 78' and an adjustment bar 82'. Rays reflected by mirror 78' will also pass through opening 83 in the housing wall 11, which for that purpose is sufficiently extended in the vertical direction. A similar opening 83' is provided in wall 11 in front of the objective 45. This opening is extended towards the vertical central plane of the camera in accordance with the possible shift of that objective. A third opening 83'', not visible in Fig. 5 is arranged in wall 11 in front of the objective 43. Opening 83'' does not require the vertical dimension of the other openings but must be large enough in the horizontal direction in accordance with the shifting of objective 43.

Means are provided for changing the position of the rods 82 and 82' and thereby the inclination of the mirrors 78 and 78' according to changes of the spacing of the camera parts 10 and 17 from each other. For this purpose a set of rails 84 and 85 are secured to the inside of side walls 15 and 16, respectively, as best seen in Figs. 3 and 6. A pair of slides 86 and 86' are guided by rails 84 so as to be movable in a vertical direction. Similarly, a pair of slides 87 and 87' are guided by the rails 85'. Bar 82 is affixed to the slides 86 and 87 and bar 82' to slides 86' and 87'. Tension springs 88 and 89 are attached to bars 82 and 82', tending to pull these bars towards each other. The bars can be slid apart against the restraint of the springs by wedge or cam-shaped pieces 90 and 91 which are of like shape. The wedge piece 90 constitutes the end portion of a bar 92 (see Figs. 1 and 6) which projects through an opening 93 in the rear wall 12 of housing 10 and which is secured to a lateral lug 94 of part 17. The wedge 91 is connected to the part 17 in a similar manner to wedge 90. Now it will be clear that the bars will be shifted apart by the wedges 90 and 91, the more camera part 17 is shifted towards the camera objective 43, whereas the bars 82 and 82' are pulled towards each other by the springs 88 and 89, the farther the part 17 is spaced from the objective. It will be further noticed that the adjustment of the mirror position by means of the bars 82 and 82' is independent of the position of carriage 60 regardless whether the latter is in the central position between the two objectives for stereo exposures, or whether it is in registry with objective 45 for single exposures.

Figure 2:
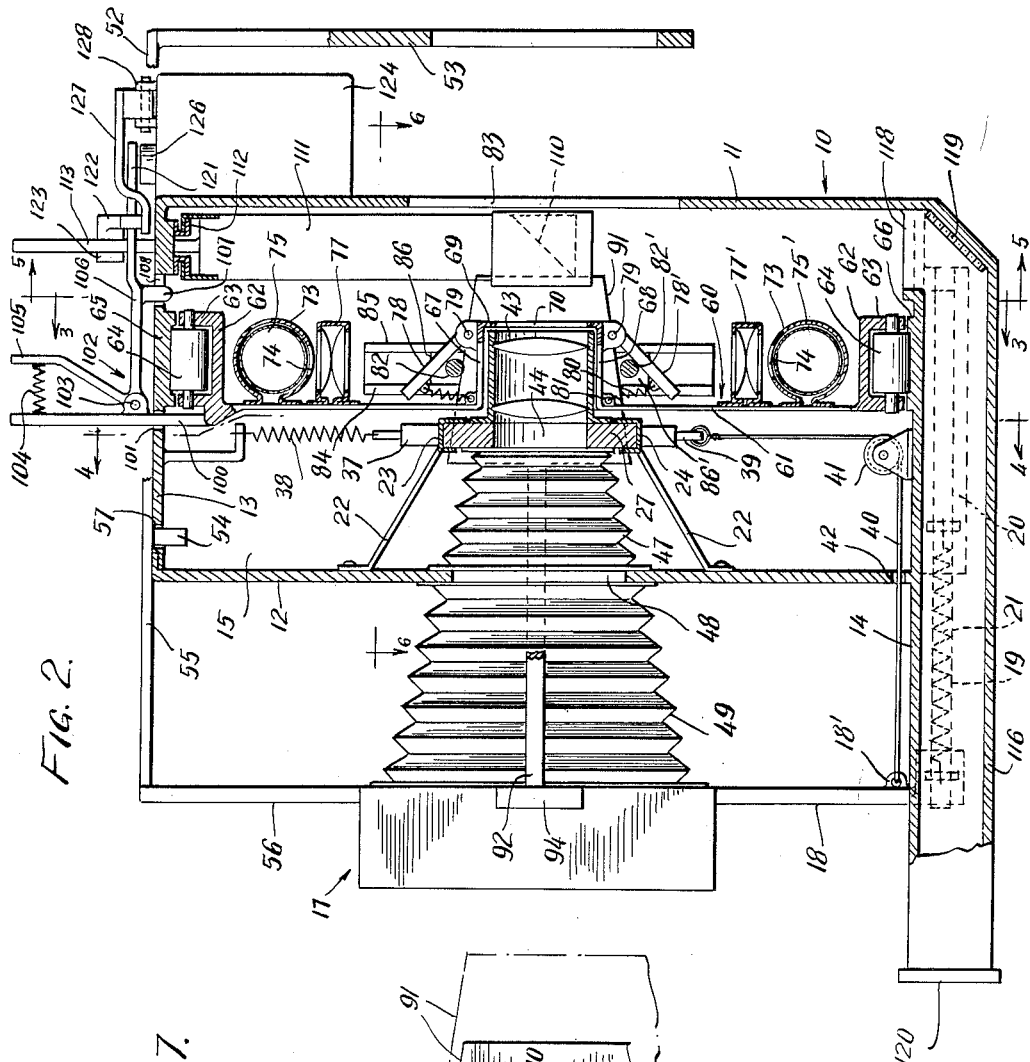

In order to shift the carriage 60 to its desired position, it is provided with an upper extension 100 projecting upward through a slot 101 in the top wall 13 (see Figs. 1 and 2). A bell crank lever 102 is pivoted to the extension 100 at 103 and a compression spring 104 tends to urge the lever arm 105 in a clockwise direction. The other lever arm 106 has a lower pin-like projection 107 which is adapted to engage into one of two holes 108 and 109 in the top wall 13 of the camera. Owing to this structure, the arm 106 can be raised by finger pressure upon the parts 100 and 105 and the carriage can be shifted to a position where the pin 107 engages in the selected one of the holes 108 and 109. These holes are so located that with pin 107 engaging hole 108 carriage 60 will be secured in its central position for stereo exposures, whereas pin 107 in engagement with hole 109 insures the position of carriage 60 for single exposures. Lever arm 106 serves an additional purpose which will be apparent hereinafter.

Viewer means of any suitable and conventional type may be provided in connection with this camera. However, in the illustrated stero camera, special means are provided in order to make the viewer useful for both kinds of exposures. For this purpose a viewing prism 110 (see Figs. 2, 5 and 6) is arranged movable in a plane in front of the objectives 43 and 45, respectively. The prism is suspended by a hanger 111 from rails 112 on the inside of the top wall 13. Hanger 111 has an extension 113 which projects through a slot 114 in wall 13 so as to form a grip whereby the viewer can be shifted into a central position in front and between the objectives 43 and 45 or into a position in front of the objective 45. A spring 115 attached to the hanger 111 and to the inside of the wall 15 tends to pull the prism towards that side wall, that means, out of the way of the light rays during an exposure. Corresponding to the two mentioned active positions of the viewer, there are two shafts 116 and 117 underneath the wall 14. Shaft 116 is arranged in the vertical central plane of the camera, whereas shaft 117, located in a parallel plane through the axis of objective 45 when the latter is shifted by cariage 60 into its end position as hereinbefore described. Shaft 116 has an opening 118 underneath the prism when the latter is in the central position, and underneath the opening 118, a mirror 119 is located at 45° to the vertical so as to reflect light rays from prism 110 towards an eye-piece 120 at the other end of shaft 116 which projects rearward beyond part 17. The arrangement with respect to shaft 117 is similar to that of shaft 116 so that either one may be used in connection with prism 110 depending on the position of the latter for stereo or single exposures. Means are provided in order to interlock the viewer with carriage 60 in the selected position of the latter. For this purpose the aforementioned arm 106 of bell crank lever 102 has an extension 121. A pawl 122 is pivoted at 123 to the viewer grip 113 so that when grip 113 is pulled against the restraint of spring 115 until it abuts against extension 121, the pawl 122 will hook on the other side of the extension 121 as clearly shown in Figs. 1 and 2 and hold the viewer coupled to the carriage. The grip 113 is so arranged with respect to the hanger 111 that the prism 110 will be in registry with opening 70 of the carriage 60 when the coupling has been accomplished. If, however, pawl 122 will be raised by means to be described hereinafter, spring 115 will withdraw the viewer prism 110 to an inoperative position. The withdrawal of the viewer prism 110 prior to an exposure is necessary because otherwise the hanger 111 would obstruct the light rays from the upper mirror 78 in both positions of the carriage and, in addition would obstruct the objective 45 in the position of the carriage for single shots.

Shutter means for objectives 43 and 45 may be provided and also switching means in order to connect the bulbs 75 and 75' to a current source during the time of exposures. The particular kind of such shutter and switching means are not part of the present invention and therefore omitted from the drawing in order to avoid crowding thereof. Suitable means for that purpose are described, for instance, in my Patents #2,239,379 of April 22, 1941, and #2,422,077, of June 10, 1947. In those patents the shutters are electrically operated in conjunction with the switching of the artificial lighting. In the case of the present invention it is sufficient, therefore, to show and describe the control means and their actuation. For this purpose a box 124 is attached to the upper portion of the front wall 11 to contain the switching and shutter operating means. Upwards from that box, control buttons 125 and 126 project as clearly shown in Figs. 1, 2 and 5. Button 125 serves to actuate shutter means of both objectives 43 and 45 and the switching means for bulbs 75 and 75' and is intended to be used for stereo exposures whereas button 126 destined to be used for single exposures may control merely the shutter of objective 45 and the switching means of the bulbs. Means are provided to actuate the buttons selectively in a fool-proof manner so that button 125 can be depressed only when carriage 60 is in its central position, and that button 126 can be depressed only when the carriage is in registry with objective 45 for single exposures. For this purpose extension 121 of lever 106 is so-shaped that it covers button 126 when the carriage is secured by pin 107 engaging hole 108. A see-saw lever 127 is pivoted at 128 on a bracket 129 erected on the top of 124. Lever 127 has one arm 130 above button 126 and an arm 131 above button 125. Arm 130, furthermore, has an extension 132 bent downwards to a level underneath the pawl 122. Similarly the arm 131 has an extension 133 which is bent down to the same level as extension 132. If now the parts are in the position of Figs. 1, 2 and 11, it will be clear that lever arm 130 cannot be depressed as the extension 121 obstructs such movement. If, however, lever arm 131 will be depressed, extension 132 of arm 130 will first raise pawl 122 so that spring 115 will pull the viewer prism 110 to the side. Further pressure will bring arm 131 to bear on push button 125 so that the latter will be actuated and the exposure will be made. If, on the other hand, the carriage is secured in the position for single exposures, i. e. by pin 107 in hole 109, and the viewer held by pawl 122 to the lever extension 121, the latter will cover button 125 while the extension 133 of the see-saw lever 127 is underneath pawl 122. In this position only the arm 130 can be depressed. Thereby, first the pawl will be raised and the viewer pulled aside and then, push button 125 will be actuated.

For making stereo exposures the camera will be used in the following manner. The carriage 60 is shifted to its central position and secured in that position by pin 107 engaging hole 108 and the viewing prism is shifted towards the carriage as far as possible, i. e. until its hanger extension 113 abuts against the piece 121 which will be engaged by pawl 122. The carriage in that position has its opening 71 in front of the objective 43 so that both objectives are unobstructed. The camera will then be focussed with respect to an object area by attaching a suitable distance piece 52. This is done, as stated hereinbefore by first pulling part 17 backward in relation to part 10, then pushing the extension 54 into the hole 57, and finally releasing part 17 until lug 56 abuts against the end portion 55 of piece 52. The movement of the part 17 in relation to part 10 is transmitted to the means for shifting wedge 37 in that the flexible member 40 attached to the lug 18' of part 17 pulls the wedge downward against the restraint of spring 36 when the distance of part 17 from part 10 is increased. Thereby, the spacing of the objectives from each other is set according to the focusing of the camera. Similarly the wedges 90 and 91 through their rods 92 connected by lugs 94 to part 17 are adjusted so as to effect proper inclination of the mirrors 78 and 78'. As stated hereinbefore, the setting of the carriage to its central position renders the control lever operative only in the one direction, i. e. so that lighting of both bulbs 75 and 75' and actuation of both objective shutters will be accomplished by depression of see-saw lever arm 131 after an automatic shift of the viewer to the side. Hence, the entire setting of the camera is fool-proof and requires merely securing of the carriage in its central position, shifting the viewer prism until it connects with the carriage and applying the selected distance piece.

In order to set the camera for single exposures, the sole difference in the manipulation consists in that the carriage is shifted so as to cause engagement of pin 107 in hole 109 rather than hole 108. Thereby, the objective 45 becomes disengaged from wedge 37 so that its position will not be changed by any change of the focusing of camera, whereas objective 43 is covered by the carriage front 69. In this position of the parts only lever arm 130 can be depressed to operate push button 126.

As stated above, certain simplifications are possible if the camera is intended exclusively for stereo exposures. In that event the carriage 60 may be replaced by a stationary structure in that the bar or strip 61 carrying the light sources, condensers and mirrors may be fixedly attached to the top wall 13 and bottom wall 14 and the viewing prism 110 may be secured e. g. to the front portion of that strip at the location of the hole 70. Furthermore, the abutments 34 and all the parts denoted by reference numerals 100 to 109, 111 to 125 and 127 to 133 may be omitted.

Although I have shown and described only one embodiment of my invention, it will be apparent to those skilled in the art that many modifications and alterations are possible without departure from the essence and spirit of the invention which for that reason shall not be limited but by the scope of the appended claims.

I claim:

1. In a stereo camera, the combination of two parallel, spaced objectives movable in the plane of and transversely to their axes, a carrier part for a photographic plate or film movable with respect to said objectives in their axial direction, a drive between said objectives and said carrier part to vary the spacing of said objectives from each other according to changes of the spacing of said carrier part from said objectives, at least one light source substantially in the central plane between said objectives, and spaced from the plane defined by the objective axes, a mirror between said last mentioned plane and said light source and so inclined as to reflect light rays from said light source forward of said objectives, and a means connected to said mirror and said carrier to change the inclination of the mirror in accordance with changes of the spacing of said carrier part from said objectives so as to direct the light rays from said light source on an area in focal relationship with respect to said objectives and the plane of the sensitive surface of a film or plate in said carrier part.

2. In a stereo camera, the combination of two parallel, spaced objectives movable in the plane of and transversely to their axes, a carrier part for a photographic plate or film movable with respect to said objectives in their axial direction, a drive between said objectives and said carrier part to vary the spacing of said objectives from each other according to changes of said carrier part from said objectives, two light sources, substantially in the central plane between said objectives and equidistant from the plane defined by the objective axes, two mirrors between said last mentioned plane and said light sources, respectively, and pivoted each about an axis transverse to the objective axes, and a means in engagement with both said mirrors and connected to said carrier, to change the mirror inclinations in opposite directions in accordance with a change of the spacing of said carrier from said objectives so as to direct the light rays from both said light sources on the same area which is in focal relationship with respect to said objectives and the plane of the sensitive surface of a film or plate in said carrier part.

3. A stereo camera comprising a box including side walls, two objectives in said box movable in the plane of and transverse to their axes, a carrier part for a photographic plate or film movable with respect to said objectives in their axial direction, a drive between said objectives and said carrier part to vary the spacing of said objectives according to changes of the spacing of said carrier part from said objectives, a member substantially in the central plane between said objectives and extending at right angles to the plane of the objective axes, two light sources mounted to said member on opposite sides of said last mentioned plane, two mirrors between said plane and said light sources, respectively, so as to reflect the rays from said light sources forward of said objectives, each mirror being pivoted to said member about an axis transverse to the objective axes, a spring for each mirror, said springs being attached to the mirrors respectively and said member and tending to turn the mirrors about the pivots in opposite directions, two bars parallel to the mirror pivots and engaging said mirrors respectively so as to prevent them from turning against the restraint of said springs, said bars being guided in said box for movement in a plane transverse with respect to the objective axes, a spring connected to said bars and tending to pull said bars towards each other, a wedge-like means between said bars, and a connection between said wedge-like means and said carrier part to change the spacing of the bars from each other in accordance with changes of the spacing of said carrier part from said objectives.

4. In a stereo camera adapted for single exposures and including a body structure and two objectives mounted therein, the combination of a shiftable member guided in said body structure and a light source carried by said member, said member having two positions, the first one being a position in which rays from said source are directed forward of said objectives in a central plane between said objectives, and the second one being a position in which said rays are directed in a plane coincident with the axis of the first one of said objectives, said member further including means to close said second objective by a shift of said member from its first to its second position and to open said second objective by a shift of said member from its second to its first position.

5. A device as claimed in claim 4, further comprising viewing means including an object-reflecting portion guided in said body structure so as to be movable in front of said objectives in a path at right angles to said objective axes, said portion having three fixed positions, the first one being in the central plane between said objectives, the second one being in registry with the first one of said objectives and the third one being laterally of said first objective remote from said second objective.

6. A device as claimed in claim 5, said viewing means further comprising two viewing shafts connected to and extending underneath said camera parallel to the objective axes, said shafts including oculars at their rear ends respectively, one of said shafts being located in the central plane between said objectives, and the other one in a parallel plane through the axis of said first objective, and each of said shafts including a reflecting means and an opening so arranged that an object image will be reflected by said reflecting portion to the reflecting means and from there to the ocular of said first shaft when said reflecting portion is in its first position and that similarly an object image will be reflected to the ocular of said second shaft when said reflecting portion is in its second position.

7. In a stereo camera adapted for single exposures and including two objectives, the combination of a carriage movable in a path at right angles to the axes of said objectives, a light source and a mirror mounted on said carriage on levels spaced from the plane defined by said objective axes, said mirror being inclined to reflect a bundle of rays from said light source forward of said objectives; said carriage having two end positions, the first one of said positions being a position in which the central ray of said bundle is located in the central plane between said objectives, and the other one being a position in which said central ray is located in a plane coincident with the axis of a first one of said objectives, and means in connection with said carriage to close the second one of said objectives when said carriage is in said second position.

8. A device as claimed in claim 7, said closure means comprising a portion integral with said carriage and extending in front of said second objective, said portion being provided with an opening in registry with said second objective when said carriage is in its first position, and constituting a cover of said second objective when the carriage is in its second position.

9. A device as claimed in claim 7, further comprising a first detent member connected to said carriage and adapted to engage a stationary part of said camera so as to hold said carriage selectively in either one of its two positions, a viewing means including an object-reflecting portion movable in front of said objectives in a path parallel to that of said carriage, a second detent member connected to said portion adapted to connect said portion releasably to said carriage so as to hold said portion between said objectives when said carriage is in its first position and to hold said portion in registry with said first objective when said carriage is in its second position, and means in connection with said portion to pull it into a position to the side of said first objective opposite said second position when said second detent is released from holding position.

10. A device as claimed in claim 7, further including a carrier part for a photographic film or plate movable so as to change the spacing of said carrier part from said objectives, said objectives including movable mounts, guide rails in which said objective mounts are shiftable in a path at right angles to the objective axes, means connected to said carrier part and adapted to engage said objective mounts to vary the spacing of said objectives from each other in response to changes of the spacing of the carrier parts from said objectives, and means in connection with said carriage to disengage said first objective from engagement with said means connected to said carrier when the carriage is shifted into its second position.

11. In a stereo camera including two objectives and adapted for single exposures, the combination of a light source, a member on which said light source is mounted, said member being shiftable and having two fixed positions; the first position being one in which rays from said light source are cast in the central plane between said objectives, the second one being a position in which the rays are cast in a plane including the axis of the first one of said objectives, a first control button for stereo exposures and coordinate with said first position of said member, a second button for single exposures and coordinate with said second position of said member, and said member including a means for rendering that button inaccessible for actuation which is not co-ordinate with the selected member position.

12. A device as claimed in claim 11, further comprising a see-saw lever for selective actuation of said buttons and having one arm above the one button and its other arm above the other button, said means for rendering said buttons inaccessible consisting of a portion of said member movable in a plane between the arms of said lever and said buttons.

13. A device as claimed in claim 12, further comprising a viewer part including a pawl adapted to couple said viewer part to said member so that said viewer part in either position of said member is in the plane of said light rays, a spring attached to said viewer part and tending to urge said viewer part to the side of said first objective remote from said second objective, and the arms of said see-saw levers including extensions in such a location relatively to said pawl, that upon depression of the one lever arm to operate the accessible button, the pawl will first be released from holding position by the extension of the other lever arm.

GUSTAV BUCKY.

REFERENCES CITED

The following references are of record in the file of this patent:

UNITED STATES PATENTS

| Number | Name | Date |
| --- | --- | --- |
| 331,448 | Ripley | Dec. 1, 1895 |
| 1,528,464 | Beidler | Mar. 3, 1925 |
| 1,755,220 | Koehne | Apr. 22, 1930 |
| 2,003,754 | Miller | June 4, 1935 |
| 2,397,742 | Kals | Apr. 2, 1946 |